(12) United States Patent
Potasek

(10) Patent No.: US 8,984,950 B2
(45) Date of Patent: Mar. 24, 2015

(54) SEPARATION MODE CAPACITORS FOR SENSORS

(75) Inventor: David P. Potasek, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 387 days.

(21) Appl. No.: 13/468,860

(22) Filed: May 10, 2012

(65) Prior Publication Data

US 2013/0298699 A1    Nov. 14, 2013

(51) Int. Cl.

| G01L 9/12 | (2006.01) |
|---|---|
| G01L 7/08 | (2006.01) |
| G01L 13/02 | (2006.01) |
| G01L 15/00 | (2006.01) |
| G01L 9/00 | (2006.01) |
| G01L 27/00 | (2006.01) |

(52) U.S. Cl.
CPC .............. *G01L 9/0048* (2013.01); *G01L 9/0072* (2013.01); *G01L 27/007* (2013.01)
USPC ................. 73/718; 73/715; 73/716; 73/717

(58) Field of Classification Search
CPC ....... G01L 9/0073; G01L 9/0005; G01L 9/12; G01L 1/148; G01L 1/086; G01L 1/142; G01B 7/22
USPC .................................................. 73/715–722
See application file for complete search history.

(56) References Cited

U.S. PATENT DOCUMENTS

| 4,523,474 | A | * | 6/1985 | Browne et al. ................. 73/724 |
|---|---|---|---|---|
| 4,773,269 | A | * | 9/1988 | Knecht et al. .................. 73/706 |
| 5,146,787 | A | * | 9/1992 | Thomas et al. ................ 73/704 |
| 5,209,121 | A | * | 5/1993 | Hafner ............................ 73/727 |
| 5,483,834 | A | * | 1/1996 | Frick .............................. 73/724 |
| 5,485,345 | A | * | 1/1996 | Lukasiewicz et al. ...... 361/283.3 |
| 5,576,483 | A | * | 11/1996 | Bonin ............................ 73/105 |
| 5,663,506 | A | * | 9/1997 | Moore et al. .................... 73/708 |
| 5,801,313 | A | * | 9/1998 | Horibata et al. ................ 73/718 |
| 6,388,299 | B1 | * | 5/2002 | Kang et al. ..................... 257/415 |
| 6,604,425 | B1 | * | 8/2003 | Hsu et al. ........................ 73/718 |
| 6,658,938 | B2 | * | 12/2003 | McIntosh .................... 73/514.32 |
| 2001/0032515 | A1 | * | 10/2001 | Willcox et al. ................ 73/715 |
| 2001/0047689 | A1 | * | 12/2001 | McIntosh .................... 73/514.32 |
| 2006/0117857 | A1 | * | 6/2006 | Zias et al. ........................ 73/724 |
| 2006/0144153 | A1 | * | 7/2006 | Brosh ............................. 73/715 |
| 2007/0277616 | A1 | * | 12/2007 | Nikkel et al. ................... 73/715 |
| 2008/0022777 | A1 | * | 1/2008 | Tan et al. ........................ 73/718 |
| 2008/0053236 | A1 | * | 3/2008 | Gogoi et al. .................... 73/718 |
| 2010/0122565 | A1 | * | 5/2010 | Miller et al. .................... 73/1.37 |
| 2013/0109990 | A1 | * | 5/2013 | Akingba et al. .............. 600/529 |

* cited by examiner

*Primary Examiner* — Lisa Caputo
*Assistant Examiner* — Jonathan Dunlap
(74) *Attorney, Agent, or Firm* — Locke Lord LLP; Scott D. Wofsy; Joshua L. Jones

(57) ABSTRACT

A capacitor for use in sensors includes opposed first and second capacitor plates, wherein the second capacitor plate is mounted to the first capacitor plate by a flexible attachment. The flexible attachment is configured and adapted so that flexure of the attachment causes a change in the spacing between the first and second capacitor plates to cause a change in the capacitance thereacross.

11 Claims, 7 Drawing Sheets

SEPARATION MODE CAPACITORS FOR SENSORS

CROSS-REFERENCE TO RELATED APPLICATIONS

This application relates to U.S. patent application Ser. No. 13/451,790 filed Apr. 20, 2012, which is incorporated by reference herein in its entirety.

BACKGROUND OF THE INVENTION

1. Field of the Invention

The present invention relates to capacitors, and more particularly to capacitors for use in sensors.

2. Description of Related Art

A variety of sensors are known that utilize capacitors as sensor elements. One such example is in MEMS pressure sensors. Typical MEMS pressure sensors have a thin diaphragm formed in one of the substrates. The diaphragm forms a first capacitor plate, which is opposed to a second capacitor plate in an adjacent substrate. When pressure is applied to the diaphragm, the diaphragm with its capacitor plate bulges towards the stationary second capacitor plate. The deflection changes the spacing between the capacitor plates which causes a change in the capacitance, which can in turn be used to determine the pressure acting on the diaphragm.

There are certain limitations and disadvantages to the typical MEMS pressure sensors. Since the diaphragm is fixed around its edges, the edges remain relatively stationary, and only the center of the diaphragm undergoes the maximum deflection at any given pressure. Therefore, the change in capacitance occurs over a relatively small effective area of the capacitor plates, which limits the sensitivity of the sensor. The smaller the diaphragm size, the worse sensitivity becomes, since capacitance is directly proportional to capacitor plate area.

Another limitation on typical MEMS pressure sensors is that the movement of the capacitor plates is toward one another as pressure increases on the diaphragm. Capacitance is inversely proportional to the distance between the capacitor plates, so capacitors are more sensitive to changes in plate spacing when the plates are closer together. So in the traditional arrangement, at low pressures the plates are at their farthest, least sensitive spacing and at high pressures, the plates are at their closest, most sensitive spacing. As a result, traditional MEMS pressure sensors are particularly sensitive only over a limited range of pressures, and they are generally insensitive to small pressure fluctuations at lower pressures.

Yet another problem with typical MEMS pressure sensors is relatively high parasitic capacitance. Parasitic capacitance is any fixed capacitance that does not change with pressure, as opposed to active capacitance, which is the sensing element that changes with applied pressure. In MEMS pressure sensors where both the diaphragm substrate and opposed capacitor substrate are made of silicon, a relatively large parasitic capacitance is present across the insulating layer where the substrates are bonded together. This parasitic, constant capacitance dilutes the signal produced from the active capacitance of the sensing element that changes with pressure. In addition, traditional all silicon sensors suffer from breakdown of dielectric layers when the wafer stack is diced, which can cause shorting of the thin dielectric layers.

Parasitic capacitance can be addressed by making the substrate opposite the diaphragm out of a glass material, while the diaphragm substrate is made of silicon, which is metalized only above the diaphragm. While this reduces parasitic capacitance, the two dissimilar materials create thermal expansion-induced stress which varies by temperature. The capacitor and diaphragm are stress-sensitive, so the thermally induced stress has an undesirable effect on sensitivity and accuracy. Moreover, the glass material typically used has creep behavior which can cause drifts and shifts in the sensor.

Such conventional methods and systems have generally been considered satisfactory for their intended purpose. However, there is still a need in the art for pressure sensors that allow for improved performance. There also remains a general need in the art for capacitors that can address the types of problems described above for a range of applications. The present invention provides a solution for these problems.

SUMMARY OF THE INVENTION

The subject invention is directed to a new and useful capacitor for use in sensors. The capacitor includes opposed first and second capacitor plates, wherein the second capacitor plate is flexibly mounted relative to the first capacitor plate by a flexible attachment. The flexible attachment is configured and adapted so that flexure of the attachment causes a change in the spacing between the first and second capacitor plates to cause a change in the capacitance thereacross. The change in spacing between the first and second capacitor plates can be substantially uniform.

In certain embodiments, a first substrate including the first capacitor plate defines a flexible diaphragm. A second substrate includes the second capacitor plate. The flexible attachment includes a pedestal mounting the second substrate to the diaphragm of the first substrate. Deflection of the diaphragm causes a change in the spacing of the first and second capacitor plates for a change in capacitance indicative of forces acting on the diaphragm. The pedestal can advantageously be mounted to a central portion of the diaphragm for enhanced capacitor sensitivity to flexure of the diaphragm. The first and second substrates can both be made of silicon, which can mitigate thermally induced stresses.

A base substrate can be mounted to a side of the first substrate opposite the second substrate with a diaphragm void defined between the diaphragm and the base substrate. A pressure passage can be defined in at least one of the base substrate and the first substrate for placing the diaphragm void in fluid communication with external pressures. A stress isolation enclosure can substantially surround the first and second substrates to isolate the first and second capacitor plates and diaphragm from packaging stress.

In certain embodiments, the first substrate includes an electrode independently operative from the first capacitor plate and the second substrate can similarly include an electrode independently operative from the second capacitor plate. The independent electrodes of the first and/or second substrates are in opposition with one another or with the opposite substrate for applying an electrostatic force on the first and second substrates when a voltage is applied across the electrodes for controlling spacing of the first and second capacitor plates.

A third substrate can be included having a flexible diaphragm. The second substrate can be mounted to the third substrate by a second flexible attachment including a pedestal mounted to the diaphragm of the third substrate, with the first and third substrates on opposite sides of the second substrate. The second substrate can be contained in a sealed space between the first and third substrates for differential pressure measurements between pressures acting on the diaphragms of the first and third substrates. A pressure routing enclosure can be included, substantially surrounding the first, second, and third substrates. The pressure routing enclosure can define fluidly isolated first and second fluid circuits for fluid communication of external pressures to the diaphragms of the first and third substrates, respectively.

The invention also provides a MEMS pressure sensor. The pressure sensor includes a first substrate including a pressure sensitive diaphragm and defining a first capacitor plate. A second substrate is mounted to the first substrate and defines a second capacitor plate opposed to the first capacitor plate to form a capacitor. The capacitance of the capacitor is variable depending on the pressure acting on the diaphragm changing the spacing between the first and second capacitor plates. The first and second capacitor plates define an effective area therebetween in which the capacitor plates are configured to be displaced relative to one another when pressure acts on the diaphragm. The effective area is larger in area than the diaphragm.

The invention also provides a method of measuring force that includes detecting a first force acting on opposed first and second capacitor plates of a capacitor, wherein the first and second capacitor plates can move relative to one another. The method also includes applying a second force to the first and second capacitor plates in response to the first force to control spacing between the first and second capacitor plates and thereby maintain capacitor sensitivity independent of the magnitude of the first force.

Detecting the first force and applying the second force can include using a closed loop control circuit to maintain spacing between the first and second capacitor plates. Applying the second force can include applying an attractive electrostatic force to the first and second capacitor plates. The electrostatic force can be provided by applying a voltage, e.g., increasing voltage magnitude, across the first and second capacitor plates, or by applying a voltage to one or more electrodes that are operative independent from the respective first and second capacitor plates as described above.

The invention also provides a method of testing performance of a capacitor for use in sensors. The method includes applying a change in force acting on opposed first and second capacitor plates of a capacitor, wherein the first and second capacitor plates are configured for movement relative to one another in response to applied forces. The method also includes measuring the change in capacitance across the first and second capacitor plates in response to the change in force for comparison with an expected capacitance change to confirm proper functioning of the capacitor.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 3:
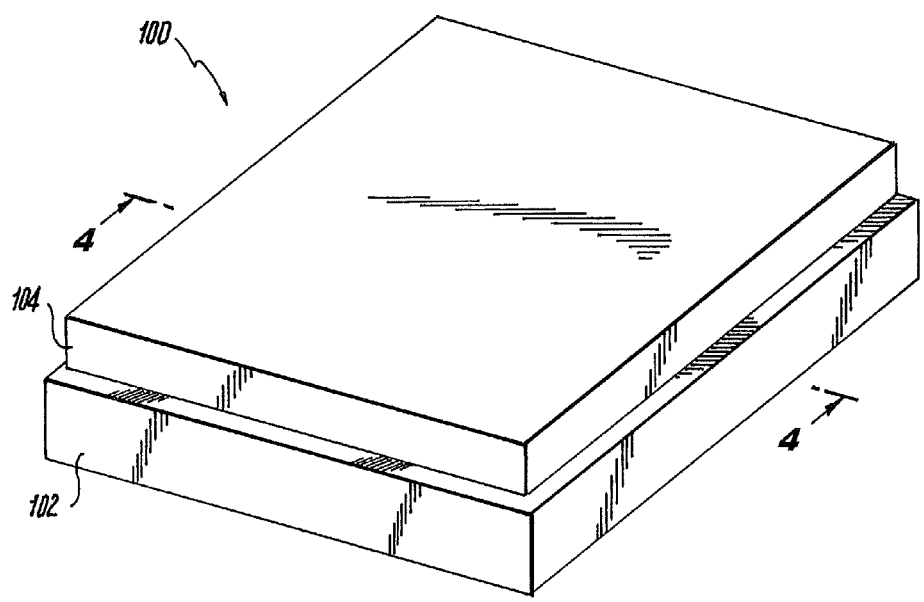
FIG. 3 is a perspective view of an exemplary embodiment of a separation mode capacitor constructed in accordance with the present invention, showing the first and second substrates.

Reference will now be made to the drawings wherein like reference numerals identify similar structural features or aspects of the subject invention. For purposes of explanation and illustration, and not limitation, a partial view of an exemplary embodiment of a capacitor in accordance with the invention is shown in FIG. 3 and is designated generally by reference character 100. Other embodiments of capacitors in accordance with the invention, or aspects thereof, are provided in FIGS. 4-13, as will be described. The systems and methods of the invention can be used to improve capacitor performance such as in MEMS pressure sensors.

Figure 1:
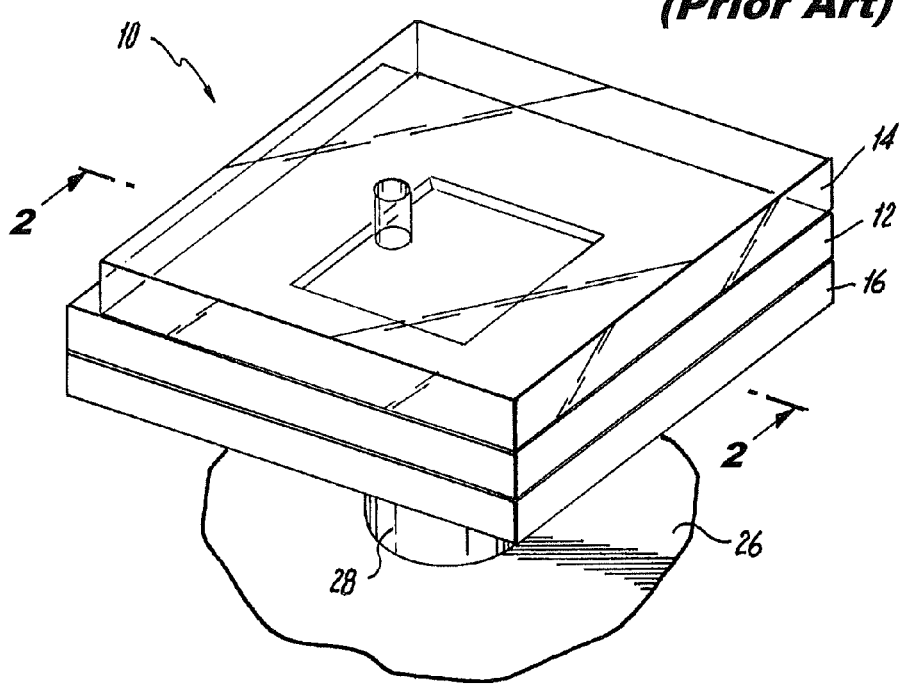
FIG. 1 is a perspective view of a prior art MEMS pressure sensor, showing the glass layer over the diaphragm.
Figure 2:
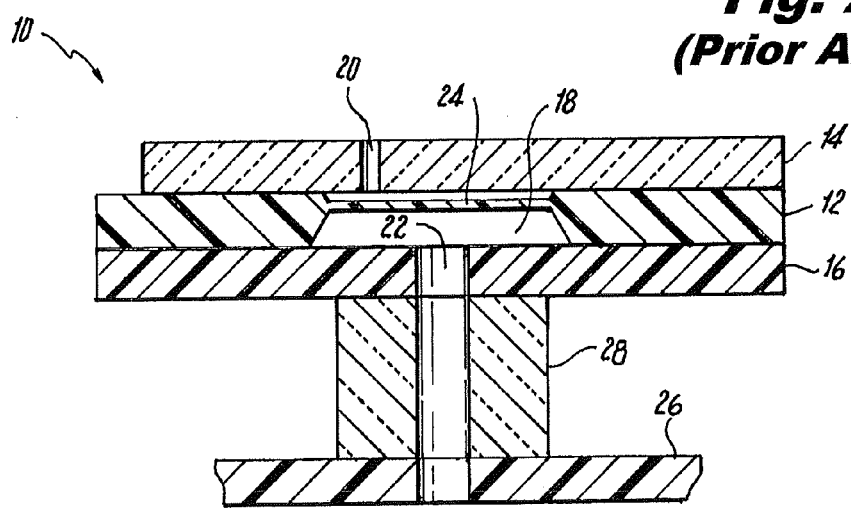
FIG. 2 is a cross-sectional front elevation view of the MEMS pressure sensor of FIG. 1, showing the diaphragm and capacitive surfaces.

Referring first to FIG. 1, an exemplary MEMS pressure sensor 10 of the prior art type is shown, having a diaphragm substrate 12 that forms a first capacitor plate, a metalized glass topping substrate 14 that forms a second capacitor plate, and a base substrate 16 that forms an enclosure around diaphragm void 18, which is shown in FIG. 2. A first pressure port 20 is formed through topping substrate 14, and a second pressure port 22 is formed through base substrate 16. Differential pressure measurements can be made by routing the two different pressures to opposite sides of diaphragm 24 by way of the first and second pressure ports 20 and 22, respectively. Base wafer 16 is separated from the surrounding package 26 by way of pedestal 28 for mitigation of packaging stress. Due to the construction and the relatively small size of diaphragm 24 compared to the size of substrates 12, 14, and 16, and due to the fact that diaphragm 24 undergoes its greatest deflection only in its center, pressure sensor 10 is prone to the shortcomings described above in the Background of the Invention.

Figure 4:
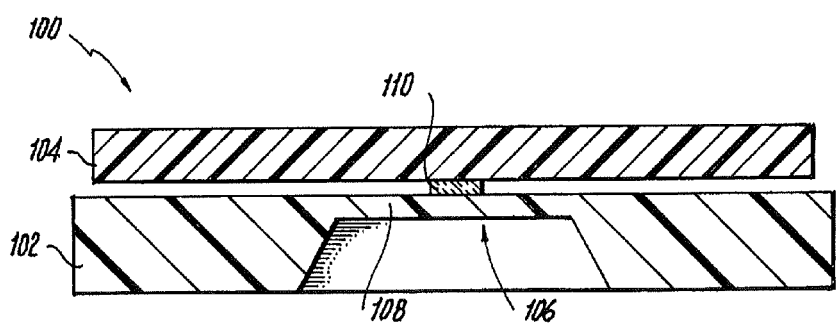
FIG. 4 is a cross-sectional front elevation view of the separation mode capacitor of FIG. 3, showing the pedestal and flexible diaphragm connecting the first and second substrates together.

With reference now to FIG. 3, a separation mode capacitor 100 in accordance with the present invention is shown, which addresses the shortcomings described above. Capacitor 100 includes opposed first and second capacitor plates 102 and 104. Second capacitor plate 104 is mounted to first capacitor plate 102 by a flexible attachment 106, as shown in FIG. 4. The first substrate that forms first capacitor plate 102 defines a flexible diaphragm 108, which is made thinner than the surrounding substrate. The second substrate that forms second capacitor plate 104 is mounted to diaphragm 108, which forms part of flexible attachment 106. Flexible attachment 106 also includes a pedestal 110 which mounts the second substrate, i.e., second capacitor plate 104, to diaphragm 108. In other words, flexible attachment 106, including diaphragm 108 and pedestal 110, flexibly connects the first and second capacitor plates 102 and 104 together.

Figure 5:
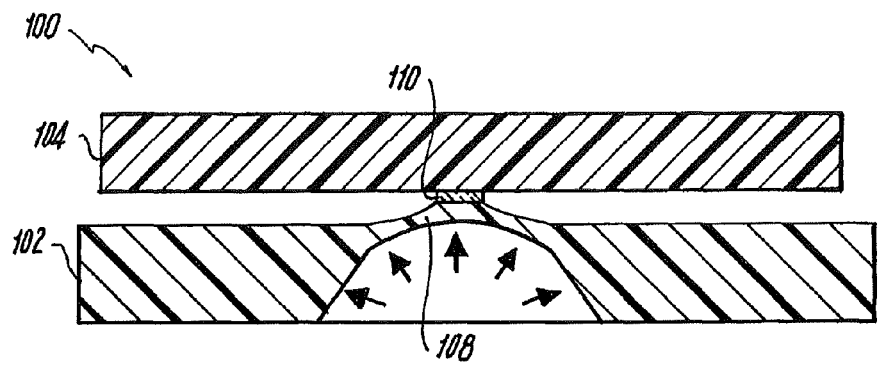
FIG. 5 is a cross-sectional front elevation view of the separation mode capacitor of FIG. 4, schematically indicating displacement of the first and second capacitor plates apart from one another when the diaphragm is pressurized.

Referring to FIG. 5, deflection of diaphragm 108 causes a change in the spacing of the first and second capacitor plates 102 and 104 for a change in capacitance indicative of forces acting on diaphragm 108. The heavy arrows in FIG. 5 schematically indicate a pressure acting to deflect diaphragm 108 upward, as oriented in FIG. 5. Comparison of FIGS. 4 and 5 shows the spacing between first and second capacitor plates 102 and 104 is increased when the pressure shown in FIG. 5 is applied. The diaphragm spacing in FIG. 5 is exaggerated for clarity. Pedestal 110 is advantageously mounted to the center of diaphragm 108 to maximize the range of motion and thereby enhance capacitor sensitivity.

The first and second capacitor plates 102 and 104 define an active, effective area therebetween in which the capacitor plates 102 and 104 are configured to be displaced relative to one another when pressure acts on diaphragm 108. The effective area is larger in area than the diaphragm 108, and in fact the effective area of capacitor 100 is independent of diaphragm size. In other words, if it is desired to increase active capacitance and capacitor sensitivity to pressure changes by increasing capacitor plate size, it is not necessary to make diaphragm 108 larger to make capacitor 100 larger in terms of effective area. Moreover, pressure sensitivity is enhanced because a relatively large area between the capacitor plates 102 and 104 undergoes maximum deflection for a given pressure, in contrast to traditional capacitors where only the center point of the diaphragm undergoes maximum deflection for a given pressure.

Due to the relatively small size of pedestal 110 compared to the total effective area of the capacitor, there is little if any parasitic capacitance. The first and second substrates are both made of silicon, which advantageously mitigates thermally induced stresses compared to traditional MEMS pressure sensors where a glass substrate is used to mitigate parasitic capacitance. Those skilled in the art will readily appreciate that it is not required for both capacitor plates 102 and 104 to be of the same material, and that any suitable materials can be used without departing from the spirit and scope of the invention.

Figure 6:
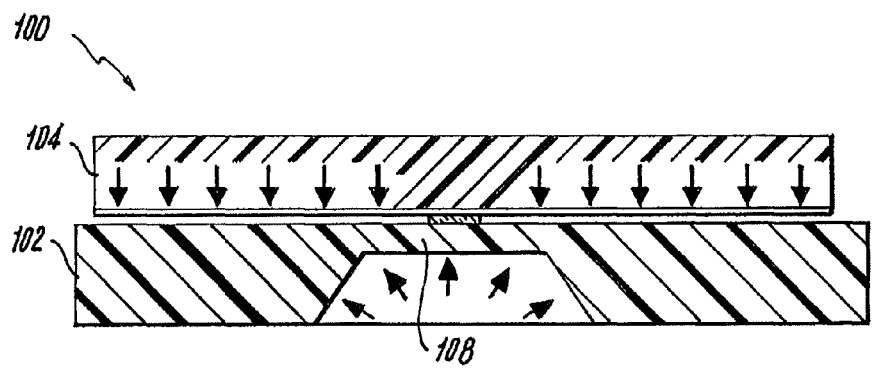
FIG. 6 is a cross-sectional front elevation view of the separation mode capacitor of FIG. 5, schematically indicating an electrostatic force counteracting the pressure acting on the diaphragm to maintain capacitor plate spacing for increased sensitivity at high pressures.

With reference now to FIG. 6, it is also possible to use an electrostatic force between first and second capacitor plates 102 and 104 to counteract a pressure force acting on diaphragm 108. The electrostatic force is indicated schematically by the arrows pointing downward in FIG. 6. This electrostatic force can be generated by controlling the voltage applied across the capacitor plates 102 and 104, and can be used to increase the sensitivity of capacitor 100 across a wider range of pressures, and/or for self-testing as described in greater detail below.

Figure 7:
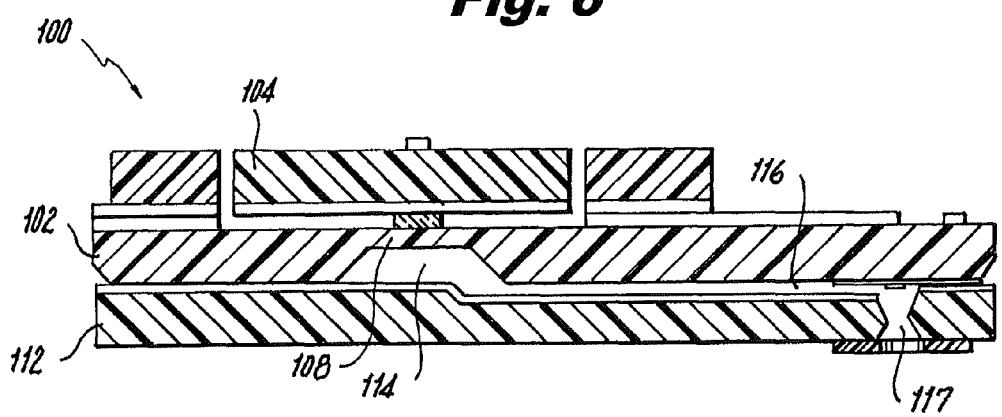
FIG. 7 is a cross-sectional front elevation view of the separation mode capacitor of FIG. 4, showing a base substrate with pressure routing passages and packaging stress isolation features.
Figure 8:
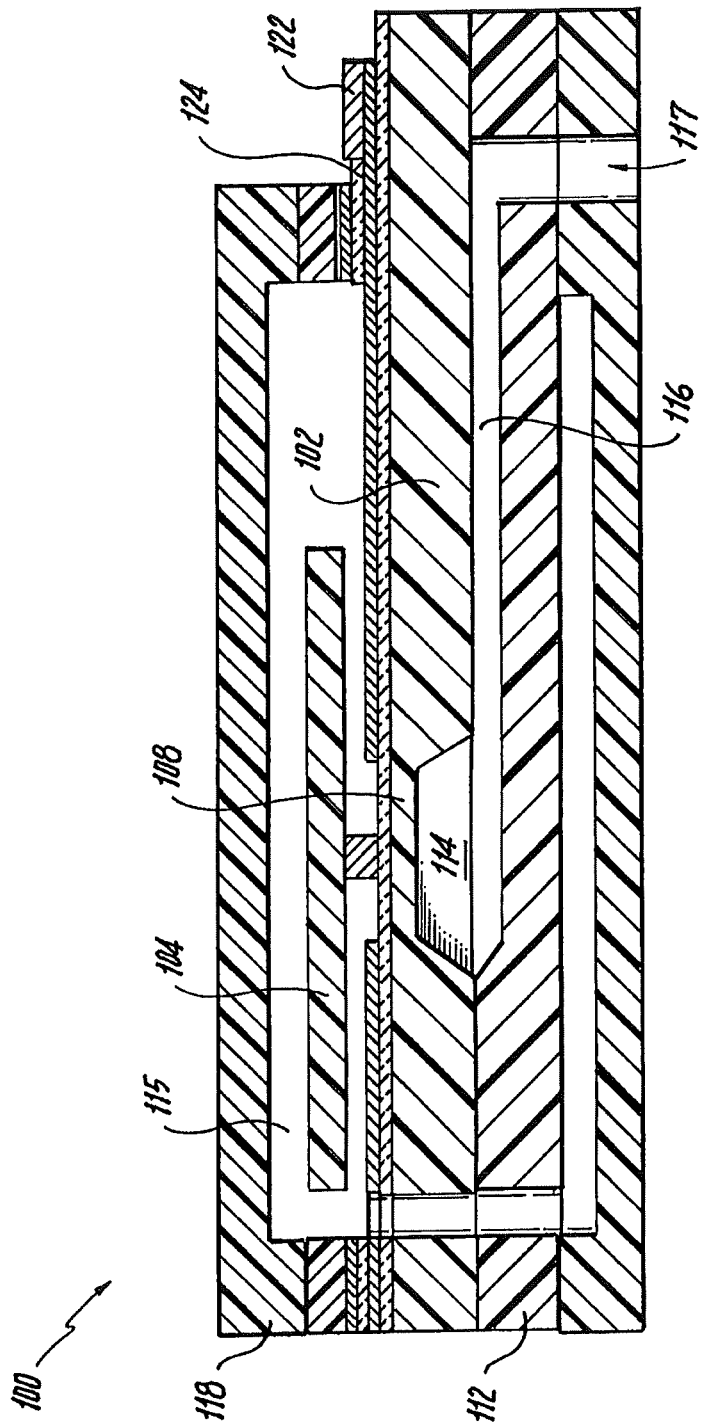
FIG. 8 is a cross-sectional front elevation view of the separation mode capacitor of FIG. 7, showing an enclosure around the first and second substrates with an in plane pedestal for stress isolation and with one fluid circuit for routing pressure for absolute pressure measurements.

Referring now to FIG. 7, a base substrate 112 is shown mounted to the side of the first capacitor plate 102 opposite the second capacitor plate 104. A diaphragm void 114 is defined between diaphragm 108 and base substrate 112. A pressure passage 116 is defined in base substrate 112 for placing the diaphragm void in fluid communication with external pressures through pressure port 117 for absolute pressure measurement. In FIG. 8, a stress isolation enclosure 118 is shown substantially surrounding the substrates of the first and second capacitor plates 102 and 104, as well as base substrate 112. This isolates first and second capacitor plates 102 and 104, and particularly diaphragm 108 from packaging stress. Further details describing such stress isolation features are described in U.S. patent application Ser. No. 13/451,790. A reference medium, such as an inert gas or vacuum can fill reference void 115 so that absolute pressure measurements can be made for external pressures acting at port 117. Bond pads 122 are provided for connection of wire bonds to enclosure 118 for electrical communication between capacitor 100 and external electronics. Electrical feed throughs 124 provide for electrical communication from capacitor components inside enclosure 118 to bond pads 122.

Figure 9:
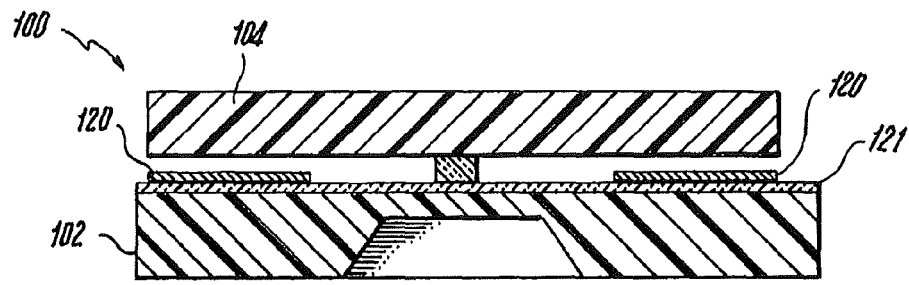
FIG. 9 is a cross-sectional front elevation view of the separation mode capacitor of FIG. 4, showing an optional electrode for applying electrostatic forces to control capacitor plate spacing.

Referring to FIG. 9, first capacitor plate 102 is shown including an electrode 120, e.g., a metallic electrode, that can form the capacitor node of the first substrate. Electrode 120 is insulated from first capacitor plate 102 by insulative layer 121, which separates electrode 120 from capacitor plate 102 so electrode 120 can be operated independently of first capacitor plate 102 when using the first capacitor plate 102 as a capacitor node. Having electrode 120 operative separate from first capacitor plate 102 allows for capacitor plate 102 to be used as a capacitor node for pressure measurements, e.g., by monitoring changes in capacitance across the first and second capacitor plates 102 and 104, while electrode 120 is used for applying an attractive electrostatic force on second capacitor plate 104 for controlling the spacing of first and second capacitor plates 102 and 104. The second substrate 104 can similarly include an electrode operative separate from the second capacitor plate 104, which can be opposed to cooperate with electrode 120 for applying electrostatic forces, for example. Those skilled in the art will readily appreciate that any suitable number of separate electrodes can be included with the first and/or second substrates without departing from the spirit and scope of the invention. Electrodes such as those described above can also be used to reduce parasitics that would otherwise be present when using an entire substrate as a capacitor plate.

Figure 10:
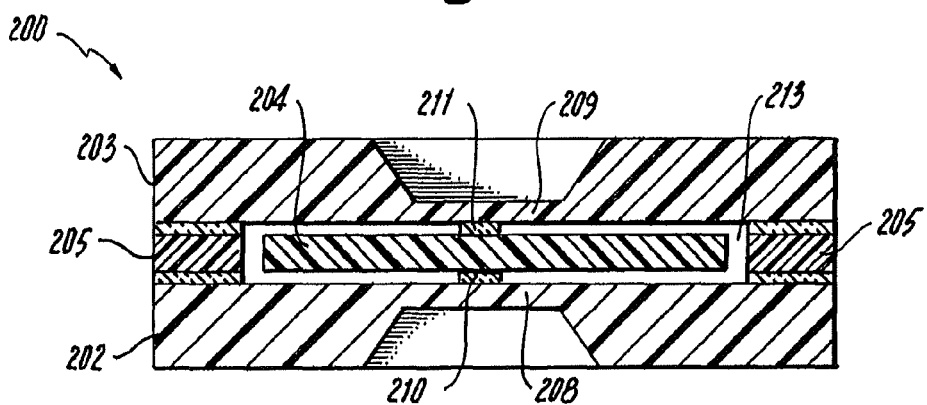
FIG. 10 is a cross-sectional front elevation view of another exemplary embodiment of a separation mode capacitor, showing a second substrate mounted by pedestals between two flexible diaphragms in opposed first and third substrates, with the second substrate sealed in a chamber between the first and third substrates.

Another exemplary embodiment of a capacitor 200 in accordance with the invention is shown in FIG. 10. Capacitor 200 includes first and second substrates that form respective first and second capacitor plates 202 and 204 connected together by a pedestal 210 mounted to a diaphragm 208 much as described above. Capacitor 200 also includes a third substrate forming a third capacitor plate 203, which has a diaphragm 209 formed therein much like diaphragm 208. Second capacitor plate 204 is mounted to diaphragm 209 of third capacitor plate 203 by way of pedestal 211. In this manner, second capacitor plate 204 has flexible attachments to both first and third substrates 202 and 203. First and third substrates 202 and 203 form a sealed space 213 around second capacitor plate 204 in cooperation with sidewall substrate 205 which mounts first and third capacitor plates 202 and 203 together. This is advantageous for consistency in measurements, since the medium filling space 213, e.g. an inert fluid or vacuum, provides constant dielectric properties, regardless of whether the external fluid being monitored for pressure changes in composition. This also protects the active capacitor components from contaminants in the pressurized fluids being measured.

Figure 11:
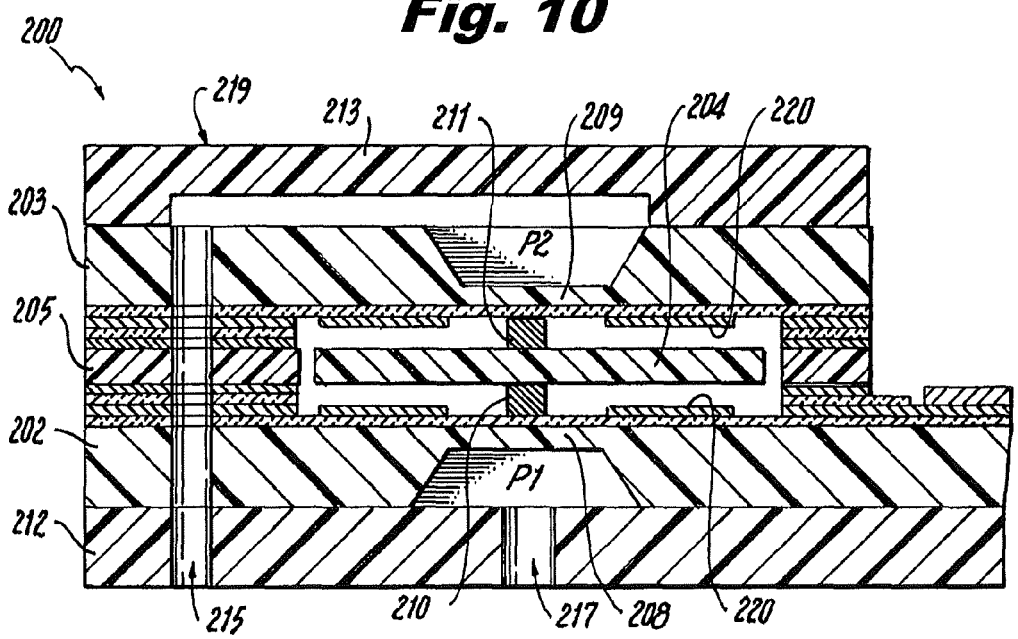
FIG. 11 is a cross-sectional front elevation view of the separation mode capacitor of FIG. 10, showing an enclosure around the first, second, and third substrates with two fluid circuits for routing pressures for differential pressure measurements.

Referring now to FIG. 11, with flexible attachments for the substrates of the first and third capacitor plates 202 and 203 on opposite sides of the substrate of the second capacitor plate 204, capacitor 200 allows for differential pressure measurements for two different pressures. Differential pressure measurements can be made of two different pressures acting on diaphragms 208 and 209, respectively, using the capacitance between first and second capacitor plates 202 and 204 and/or between second and third capacitor plates 204 and 203. Signals from first and third capacitor plates 202 and 203 can be constructively combined for enhanced sensitivity and resolution.

It is also contemplated that one of the pedestals, e.g., pedestal 211, can be removed and only two of the three capacitor plates, e.g., capacitor plates 203 and 204, can be used for capacitance This would not necessarily be a strictly separation-mode capacitor, but would still provide many of the same advantages over the prior art MEMS pressure sensors given the substantially uniform change in the spacing between the entire capacitor plates with pressure changes. For example such a modification could provide an absolute pressure sensor with reduced parasitic capacitance and improved sensitivity compared to traditional MEMS pressure sensors.

Pressure routing enclosure 219 includes a topping substrate 213 and a base substrate 212 to surround the first, second, and third substrates 202, 204, and 203. A first pressure port 217 is formed in base substrate 212 to provide a first fluid circuit for fluid communication of a first pressure P1 from an external source to the diaphragm void of diaphragm 208. A second pressure port 215 is formed in base substrate 212, first capacitor plate 202, sidewall substrate 205, third substrate 203, and topping substrate 213 to provide a second fluid circuit fluidly isolated from the first fluid circuit for fluid communication of a second pressure P2 from an external source to the diaphragm void of diaphragm 209. The pressure routing of ports 215 and 217 allows for two separate pressure feeds to be connected to the same side of the enclosure 219, however, those skilled in the art will readily appreciate that the pressure routing can be to different sides of the enclosure without departing from the spirit and scope of the invention. Electrodes 220 are provided on each of first and third capacitor plates 202 and 203, much as described above with respect to electrode 120.

Figure 12:
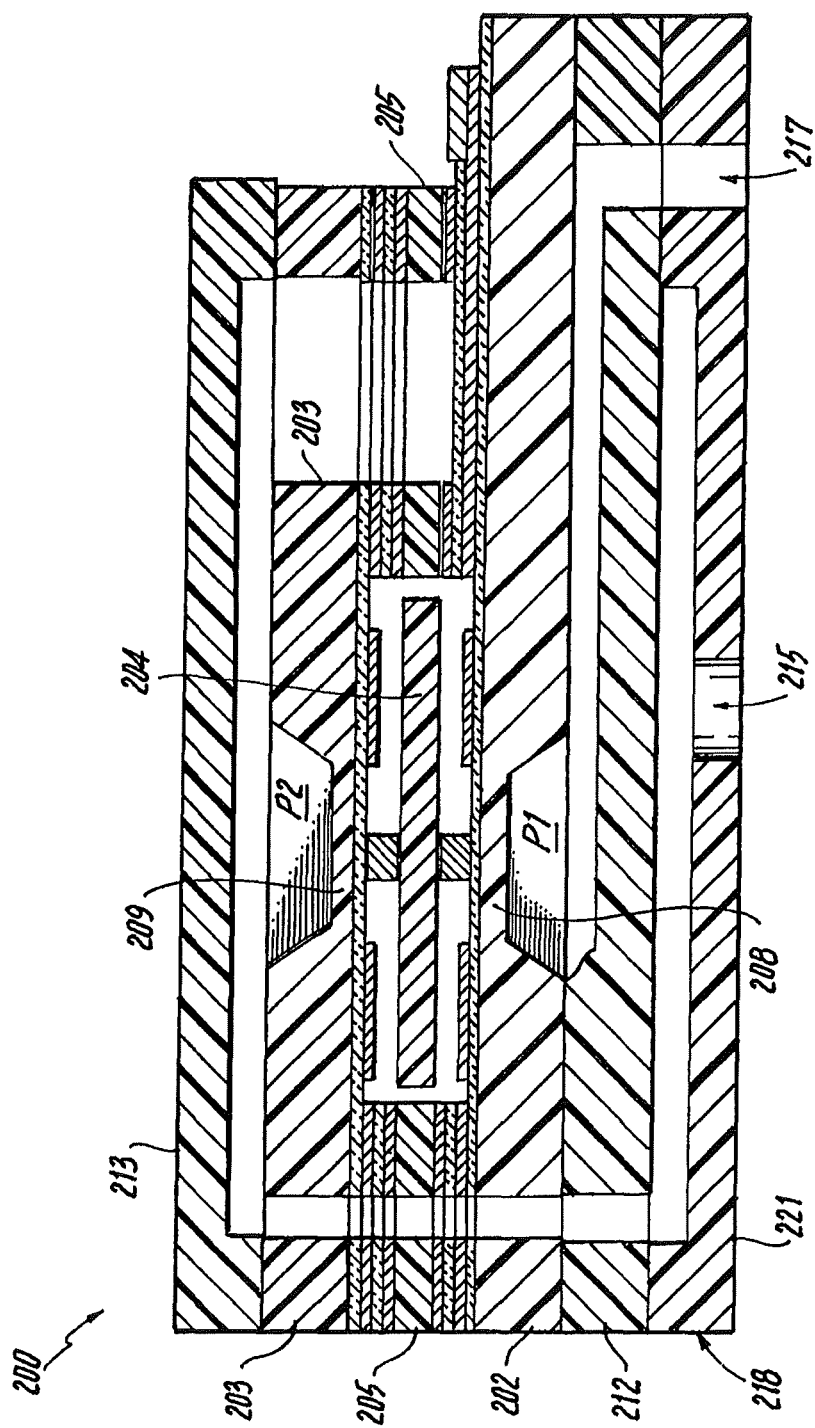
FIG. 12 is a cross-sectional front elevation view of the separation mode capacitor of FIG. 10, showing an enclosure around the first, second, and third substrates with an in plane pedestal for stress isolation and with two fluid circuits for routing pressures for differential pressure measurements.

A similar enclosure configuration for capacitor 200 is shown in FIG. 12, with base, sub-base, and topping substrates 212, 221, and 213 providing pressure routing for first and second pressures via pressure ports 215 and 217 much as described above. The enclosure 218 is a stress isolating, pressure routing enclosure where stress isolation is enhanced by a lateral pedestal in first capacitor plate 202 and base substrate 212, as described in U.S. patent application Ser. No. 13/451,790.

Figure 13:
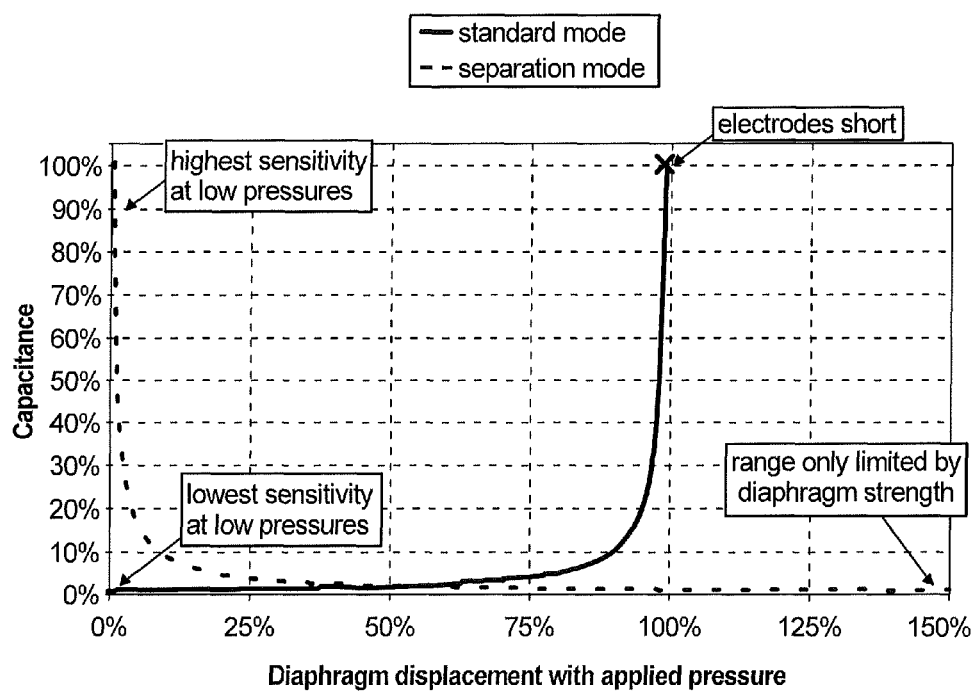
FIG. 13 is a graph comparing capacitance as a function of applied pressure for standard capacitors and for separation mode capacitors constructed in accordance with the present invention.

With reference now to FIG. 13, the sensitivity of traditional, standard mode MEMS pressure sensor capacitors is compared to sensitivity in separation mode capacitors such as capacitors 100 and 200. Capacitance is inversely proportional to the distance separating the capacitor plates. So for traditional, standard mode capacitors, the lowest sensitivity is at the lowest pressures where the plates are far apart and small diaphragm deflections do not have a large effect on capacitance. The highest sensitivity is at higher pressures where the capacitor plates are closest together and small deflections are significant to overall capacitance. The high pressure end of the pressure range is limited by the pressure at which the electrodes short due to contacting one another.

In contrast, for separation mode capacitors, the highest sensitivity is at the lowest pressures where the plates are close together and small diaphragm deflections significantly affect capacitance. There is a potential limit on low pressure fluctuation sensitivity in separation mode capacitors due to the need to keep the walls spaced apart sufficiently or otherwise configured to avoid stiction, i.e., where two very flat surfaces come in close enough proximity for van der Waals forces to cause the surfaces to attract and stick together. The lowest sensitivity for separation mode capacitors is at higher pressures where the capacitor plates are far apart and small diaphragm deflections do not have as significant of an effect on capacitance. The upper pressure for separation mode capacitors is limited only by the burst strength of the diaphragm, not just touching and shorting the electrodes as in traditional capacitors. This gives separation mode capacitors a higher overpressure limitation than standard mode capacitors. In summary, the sensitivity of separation mode capacitors as a function of pressure is opposite that of standard mode capacitors because the motion of the capacitor plates is reversed.

Although in the simplest operation of separation mode capacitors sensitivity is greatest at low pressures, high sensitivity can be extended across the whole operational pressure range by controlling plate separation. By monitoring for changes in capacitance in a separation mode capacitor, such as capacitors 100 and 200 described above, a first force, e.g., a pressure force, can be detected acting on opposed first and second capacitor plates. A second force can be applied to the first and second capacitor plates in response to the first force to control spacing between the first and second capacitor plates and thereby maintain capacitor sensitivity independent of the magnitude of the first force, as indicated schematically in FIG. 6.

Maintaining spacing between the first and second capacitor plates can be by way of a closed loop control circuit using the capacitance change caused by the first force, e.g., the pressure force, as an input and applying an opposing second force in response to the first force. The second, controlled force can simply be an attractive electrostatic force applied to the first and second capacitor plates by increasing or decreasing the applied voltage thereacross as needed to maintain capacitor plate spacing. The electrostatic force can also be provided by applying a voltage, e.g., increasing voltage magnitude, to electrodes that are operative independent from the first and second capacitor plates, such as electrodes 120 and 220 described above.

In an exemplary method, as a pressure acting on a capacitor diaphragm increases or decreases, the change in capacitance is detected when the capacitor plate spacing begins to change. In response, the voltage applied across the capacitor plates is increased or decreased as needed to return the capacitor plates to the original spacing, maintaining essentially constant capacitance. The output is the applied voltage needed to maintain constant capacitance, which voltage can be correlated to pressure. Since the plates are maintained close together, and since the output is voltage applied rather than capacitance, sensitivity to pressure change remains high across the entire operational pressure range. Closed loop control of capacitor plate spacing is advantageous since it improves linearity and bandwidth in addition to extending the high sensitivity small gap region of operation over the entire operational pressure range. Closed loop control also provides quicker electrical response to change.

Separation mode capacitors also provide the advantage of self-testing and diagnostic capabilities in accordance with the present invention. An exemplary method of testing performance of a separation mode capacitor includes applying a change in force acting on opposed first and second capacitor plates, such as those described above in capacitors 100 and 200. Measuring the change in capacitance across the first and second capacitor plates in response to the change in force provides a value that can be compared in an open loop manner with an expected capacitance change value to confirm proper functioning of the capacitor. The force used for self testing can be an electrostatic force as described above.

In preparing thin film stacks, which can be used to make capacitors 100 and 200, thin film insulators such as silicon dioxide are often used to electrically isolate two or more wafers from each other. However, when such a wafer stack is diced, the dicing blade often smears the wafers through the thin insulation layer. The insulation layers are often on the order of 1 micron thick or less, so the smearing of conductive particles often causes an electrical short between the wafers across the insulator layer at the dicing location. This shorting can be avoided by pre-etching the dicing lane prior to dicing. For example, a pre-etched cavity can be formed in one of the wafers adjacent the insulation layer between the two wafers. The pre-etched cavity should be wider than the dicing blade. The dicing saw can still cut through both wafers at the pre-etched cavity, smearing particles of the wafers in the dicing location. However, the blade damage does not cause shorting since a smeared particle would have to span the entire shelf length of the pre-etched cavity, which can be made as large as desired, e.g., on the order of 100 microns, in order to form a path for a short across the insulator layer. In other words, the pre-etched cavity size makes it unlikely that a smeared particle will be large enough to cause a short, for example by raising the minimum particle length needed to cause a short circuit from on the order of 1 micron to on the order of 100 microns.

While shown and described above in the exemplary context of pressure sensors, those skilled in the art will readily appreciate that the systems and methods described herein can be used in any other suitable application without departing from the spirit and scope of the invention. For example, separation mode capacitors can be used in accelerometers wherein one of the capacitor plates, e.g., second capacitor plate 104, is a proof mass that causes deflection of the diaphragm under acceleration. The thickness of the proof mass substrate could be made thicker without changing the electrical properties of the capacitor, or in the case of pressure sensors, the thickness of the proof mass could be made thicker or thinner to dampen operational vibration based on a given application. While described herein in the exemplary context of MEMS, those skilled in the art will readily appreciate that separation mode capacitors and methods can be used on any size scale without departing from the spirit and scope of the invention.

The methods and systems of the present invention, as described above and shown in the drawings, provide for capacitors with superior properties including improved sensitivity and accuracy in sensor applications. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A capacitor for use in sensors comprising:
opposed first and second capacitor plates, wherein the second capacitor plate is flexibly mounted relative to the first capacitor plate by a flexible attachment configured and adapted so that flexure of the attachment causes a change in spacing between the first and second capacitor plates to cause a change in capacitance thereacross;
a first substrate including the first capacitor plate and defining a flexible diaphragm; and
a second substrate including the second capacitor plate, wherein the flexible attachment includes a pedestal mounting the second substrate to the diaphragm of the first substrate so deflection of the diaphragm causes a change in the spacing of the first and second capacitor plates for a change in capacitance indicative of forces acting on the diaphragm, wherein the first and second capacitor plates define an effective area therebetween in which the capacitor plates are configured to be displaced relative to one another when pressure acts on the diaphragm, wherein the effective area is larger in area than the diaphragm.

2. A capacitor as recited in claim 1, wherein the pedestal is mounted to a central portion of the diaphragm for enhanced capacitor sensitivity to flexure of the diaphragm.

3. A capacitor as recited in claim 1, further comprising a base substrate mounted to a side of the first substrate opposite the second substrate with a diaphragm void defined between the diaphragm and the base substrate.

4. A capacitor as recited in claim 3, wherein a pressure passage is defined in at least one of the base substrate and the first substrate for placing the diaphragm void in fluid communication with external pressures.

5. A capacitor as recited in claim 1, wherein the first substrate includes an electrode separate from the first capacitor plate, wherein the electrode is in opposition to the second substrate for applying an electrostatic force on the first and second substrates when a voltage is applied to the electrode for controlling spacing of the first and second capacitor plates.

6. A capacitor as recited in claim 5, wherein the second substrate includes an electrode separate from the second capacitor plate, wherein the electrodes of the first and second substrates are in opposition for applying an electrostatic force on the first and second substrates when a voltage is applied across the electrodes for controlling spacing of the first and second capacitor plates.

7. A capacitor as recited in claim 1, further comprising a third substrate including a flexible diaphragm with a second flexible attachment including a pedestal mounting the second substrate to the diaphragm of the third substrate with the first and third substrates on opposite sides of the second substrate, wherein the second substrate is contained in a sealed space between the first and third substrates for differential pressure measurements between pressures acting on the diaphragms of the first and third substrates.

8. A capacitor as recited in claim 7, further comprising a pressure routing enclosure substantially surrounding the first, second, and third substrates and defining fluidly isolated first and second fluid circuits for fluid communication of external pressures to the diaphragms of the first and third substrates, respectively.

9. A capacitor as recited in claim 1, further comprising a stress isolation enclosure substantially surrounding the first and second substrates to isolate the first and second capacitor plates and diaphragm from packaging stress.

10. A capacitor as recited in claim 1, wherein the first and second substrates are both of silicon.

11. A MEMS pressure sensor comprising:
- a first substrate including a pressure sensitive diaphragm and defining a first capacitor plate; and
- a second substrate mounted to the first substrate and defining a second capacitor plate opposed to the first capacitor plate to form a capacitor, the capacitance of which is variable depending on pressure acting on the diaphragm changing spacing between the first and second capacitor plates, wherein the first and second capacitor plates define an effective area therebetween in which the capacitor plates are configured to be displaced relative to one another when pressure acts on the diaphragm, wherein the effective area is larger in area than the diaphragm.

* * * * *